Feb. 10, 1931. F. M. JACOBSSON ET AL 1,792,016
EXCESS SUPPLY METER
Filed June 14, 1928

F. M. Jacobsson and
F. G. Ljungdahl INVENTORS

By Marks & Clerk
Att'ys

Patented Feb. 10, 1931

1,792,016

UNITED STATES PATENT OFFICE

FRITZ MAURITZ JACOBSSON, OF STOCKHOLM, AND KARL-GUSTAF LJUNGDAHL, OF VASTERAS, SWEDEN, ASSIGNORS TO TELEFONAKTIEBOLAGET L. M. ERICSSON, OF STOCKHOLM, SWEDEN, A COMPANY OF SWEDEN

EXCESS-SUPPLY METER

Application filed June 14, 1928, Serial No. 285,484, and in Sweden June 16, 1927.

The invention relates to integrating meters of the kind which are provided with one or more counters for metering the excess supply above one or more determined supply limits. More particularly, the invention relates to such meters of the said kind in which the excess supply registering counters are arranged to be connected up and disconnected periodically under the control of a time integrating metering member arranged to be driven directly or indirectly from the meter, and adapted to be restored to a starting position periodically at even time intervals under the control of a clock-work or the like. The object of the invention is to provide means for adjusting the supply limits of the counters. It is previously known in excess supply meters having a single excess supply counter, to adjust the meter for different limits of supply by varying correspondingly the starting position of the said integrating metering member. This arrangement, however, has certain practical disadvantages and, moreover, is not practicable for meters provided with a plurality of excess supply counters. The present invention relates to improved means for adjusting the excess supply limits and, principally, consists in the excess supply counters being arranged to be connected up through the medium of actuating members which are adjustable in relation to a fixed starting position of the integrating metering member.

The invention will be more closely described with reference to the accompanying drawing. Fig. 1 shows an embodiment of the invention as applied to meters in which the counters are driven by means of electrical current impulses sent from a contact device operated by the meter. Said contact device is arranged in known manner so that the number of current impulses sent out during each time interval is proportional to the value of the quantity integral during the same time interval.

Figure 1:
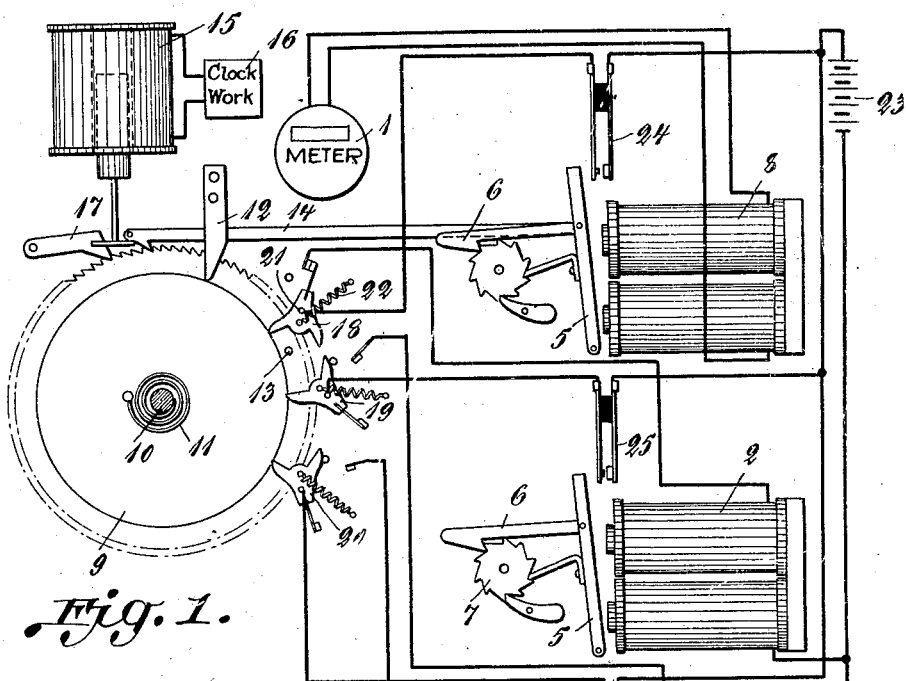

Referring to Fig. 1 of the drawing, 1 designates a standard type of time integrating meter for metering electrical energy. It is provided with a contact device of the kind just mentioned. The excess supply counters are in the example shown separated from the meter 1. They are represented in the drawing by the operating magnets 2, 3, 4. Three different counters are shown adapted for registering the excess supply above three corresponding limits, but any number of counters may be provided. The counter wheels, which are not shown in the drawing, are adapted to be operated in known manner by means of a pawl 6 connected with the armature 5 and co-operating with a toothed wheel 7 on the shaft of the counter. In addition to said counters there is provided a similar fourth counter the operating magnet 8 of which is always connected into the impulse circuit of the meter 1. This counter will, consequently, register the total supply. At the same time it will indicate the total number of current impulses sent from the meter, and it may therefore also serve as a means for controlling the correct operation of the contact device. The electromagnet 8 also operates to advance the above-mentioned time integrating metering member which, in the example shown, consists of a ratchet wheel 9 rotatable on a fixed shaft 10 and restrained by a spring 11 adapted to turn the wheel to its starting position in a counter-clockwise direction, said starting position being determined by a fixed abutment 12 and a pin 13 provided on the wheel 9. The wheel 9 is arranged to be moved in a clockwise direction by means of a pawl 14 connected to the armature of the magnet 8, and is adapted to be restored periodically to its starting position by means of a solenoid 15 the circuit of which is controlled by a conventional clockwork 16 arranged to send a current impulse through the solenoid at equal time intervals, for instance at each quarter of an hour. This clockwork may be of any kind if only it is provided with a suitable impulse sender. The solenoid, upon operating, will lift the pawl 14 as well as a detent 17 out of engagement with the wheel 9 which is then restored to its starting position by the spring 11.

Mounted on a fixed frame, not shown, and distributed along the periphery of the wheel 9 there are three electrical switches 18, 19, 20 by means of which the electromagnets 2, 3, 4 of the excess supply counters can be connected in succession into corresponding impulse circuits. Said switches are pivoted on a fixed pin 21 and are restrained by a spring 22 by means of which the switches are normally held in their opened position. The impulse circuits of the excess suppy counters are supplied with current from a source of current 23. Included in the circuit of the magnet 2 is a contact device 24 arranged to be operated by the armature of the magnet 8. The circuit of the magnet 3 contains a similar contact device 25 arranged to be operated by the armature of the magnet 2. Similarly the circuit of the magnet 4 contains a contact device 26 operated by the magnet 3.

The meter operates as follows. The current impulses sent from the meter 1 will at first advance the wheel 9 a certain number of steps, while all the excess supply counters are inoperative. After the wheel 9 has been advanced for instance ten steps the switch 18 will be operated by the pin 13 so as to be shifted into its closed position, as shown in the drawing, in which position it is retained by the spring 22. The next current impulse will therefore close a circuit through the magnet 2 the contact device 24 and the switch 18, the magnet 2 then attracting its armature and advancing the counter one step. All the following impulses will similarly operate the magnet 2 thus causing the first excess supply counter to register the excess supply above a certain supply limit. After the sending of a certain number of additional current impulses the switch 19 will be operated similarly by the pin 13 so as to connect the magnet 3 of the second excess supply counter into the circuit containing the contact device 25. Finally, also the third excess supply counter may be connected up over the switch 20 after the meter 1 has sent a number of impulses corresponding to the supply limit of the counter last mentioned.

At the end of the time period during which this operation has taken place and which may be for instance a quarter of an hour, the solenoid 15 will receive a current impulse, whereby the wheel 9 is restored to its initial position. During the return movement of the wheel 9 the switches 18, 19, 20 are successively shifted into their open position by the pin 13. After the said release impulse has ceased the switching operation just described will be repeated.

It will appear from the above description that the different excess supply counters will register during each period of time the excess supply above certain limits represented by the positions of the switches 18, 19, 20. In accordance with the present invention said switches are adjustable along the periphery of the wheel 9 into different positions in relation to the starting position of the wheel in such a manner that the said supply limits may be varied as desired in each particular case in respect of their individual values.

Figure 3:
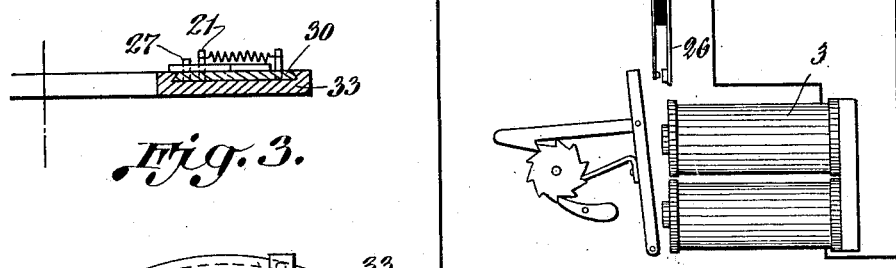
Fig. 3 is a sectional view through one of the switch supporting slides.
Figure 2:
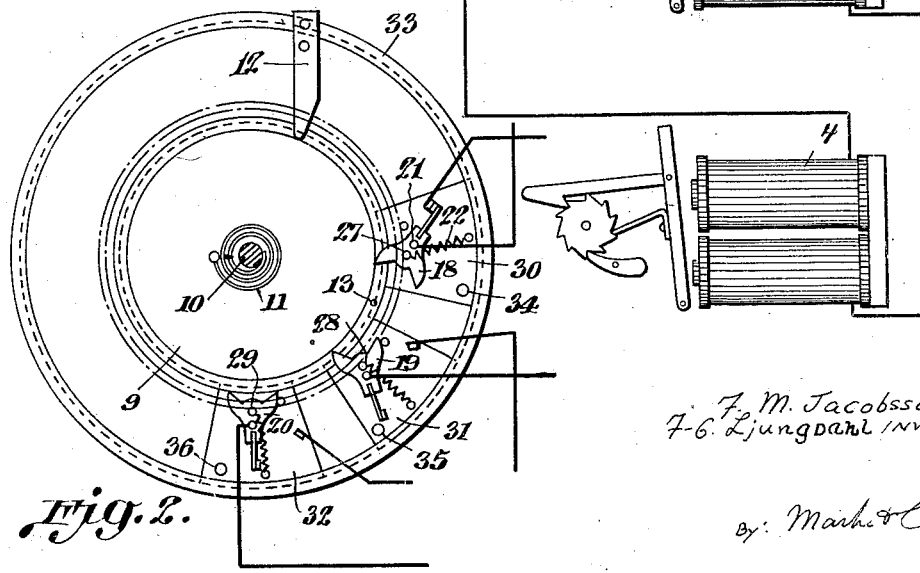
Fig. 2 is a detail view showing the adjustable mountings for the switches.

In Figure 2 there is shown an arrangement by means of which these switches may be adjusted in relation to the starting position of the wheel 9. The switches 18, 19, 20 by means of pins 27, 28, 29 are mounted on slides 30, 31, 32 respectively, these slides being displaceable along an annular slide-rail 33, which is mounted concentrically to the wheel 9. Figure 3 represents a cross section of the annular slide-rail 33 by the radius through one of the pins 27, 28, 29. The slides 30, 31, 32 may be secured in their positions by means of screws 34, 35, 36.

We claim:

1. An excess supply meter comprising in combination a time integrating metering member, means for moving said metering member in accordance with the supply, means for restoring said time integrating member at intervals to starting position, a number of counters for metering the excess supply above predetermined limits, a corresponding number of switches mounted along the path of movement of the integrating metering member, means to operate said switches in certain positions of said metering member, each of said positions corresponding to a certain limit of supply, a number of impulse circuits adapted to be closed by means of said switches and arranged electrically to control the supply counters.

2. An excess supply meter comprising in combination a time integrating metering member, means for moving said metering member in accordance with the supply, means for restoring said time integrating member at intervals to starting position, a number of counters for metering the excess supply above predetermined limits, a corresponding number of switches mounted along the path of movement of the integrating metering member, means to operate said switches in certain positions of said metering member each of said positions corresponding to a certain limit of supply, a number of impulse circuits adapted to be closed by means of said switches and arranged electrically to control the supply counters, a counter adapted to register all the current impulses sent from the meter.

3. An excess supply meter comprising in combination, a time integrating metering member, means for moving said metering member in accordance with the supply, means for restoring said time integrating member at intervals to starting position, a number of counters for metering the excess supply above predetermined limits, electromagnetic devices adapted to operate each of said counters and impulse sending means for operation of said electromagnetic devices from the supply meter.

4. An excess supply meter comprising in combination, a time integrating metering member, means for moving said metering member in accordance with the supply, means for restoring said time integrating member at intervals to starting position, a number of counters for metering the excess supply above predetermined limits, electromagnetic devices adapted to operate each of said counters and impulse sending means for operation of said electromagnetic devices from the supply meter in accordance with the predetermined limits of supply.

5. An excess supply meter comprising in combination, a time integrating metering member, means for moving said metering member in accordance with the supply, means for restoring said time integrating member at intervals to starting position, a number of counters for metering the excess supply above predetermined limits, electromagnetic devices adapted to operate each of said counters and impulse sending means for operation of said electromagnetic devices from the supply meter in accordance with the predetermined limits of supply and operating means to advance the time integrating metering member by one of said electromagnetic devices.

6. An excess supply meter comprising in combination, a time integrating metering member, means for moving said metering member in accordance with the supply, means for restoring said time integrating member at intervals to starting position, a number of counters for metering the excess supply above predetermined limits, electromagnetic devices adapted to operate each of said counters and impulse sending means for operation of said electromagnetic devices from the supply meter and operating means to advance the time integrating metering member by one of said electromagnetic devices.

In testimony whereof we affix our signatures.

FRITZ MAURITZ JACOBSSON.
KARL-GUSTAF LJUNGDAHL.